3,111,954
PORTABLE WASHER FOR BULK MILK TANKS
Leon L. Duncan, Washington, Mo., assignor to Zero Manufacturing Company, Washington, Mo., a company of Missouri
Filed Aug. 25, 1961, Ser. No. 133,870
4 Claims. (Cl. 134—169)

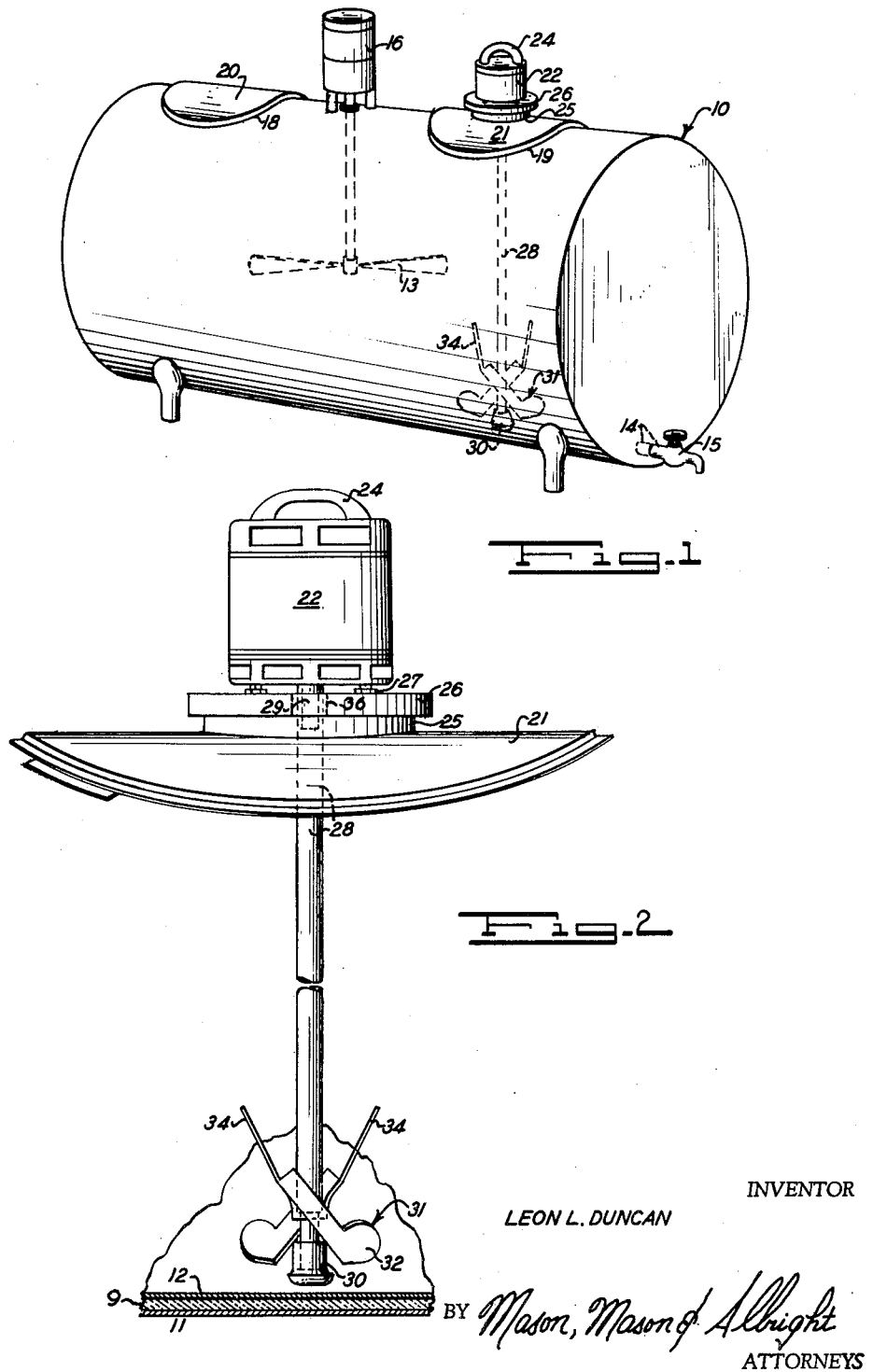

This invention relates to a portable washer for bulk milk tanks and has particular reference to a washer, combined with a lid for such tanks, which has a shaft extending from a motor on top of the lid into the tank with a propeller-type scoop means incorporated in a lower aspect of the shaft.

Existing portable washers are somewhat similar to a lawn sprinkler which rotates. They generally have a plurality of parts which move in relation to each other with cleansing liquid forced through a hollow shaft to the sprayer where it is disseminated throughout the interior of the tank. In washers of this type the moving parts are of themselves a source of difficulty inasmuch as sanitation considerations restrict the use of grease or oil lubrication of such parts where they bear on each other. In addition, leakproof fluid connections are required for the liquid involved, which compounds the difficulties.

Where washers of the type concerned are installed as permanent fixtures, there exists, despite their distinct advantages, doubt as to whether the high degree of sanitation necessary in handling milk is not compromised. More importantly, when repairs are required on installations with permanent washers, it is sometimes necessary to place the tank involved out of operation for a considerable length of time. Further, in contrast to the invention herein, existing fixtures of the permanent type usually incorporate paddles for agitating in addition to those for cleaning purposes.

Advantages of this invention include the fact that the portable washer disclosed herein can be used with a pour-in bulk milk tank as well as more sophisticated types of bulk milk vacuum tanks. The particular design involved overcomes sanitation difficulties in that the cleaning element can be completely removed from the tank and cleaned by hand outside the tank where all surfaces can be inspected conveniently. It will be noted also that the invention can be used for several tanks: that is to say, the same portable washer can be used in first one tank, then the other and so on, in dairy farms where a number of tanks are employed. Moreover, the requirement for repairs on the portable washer of this invention will not place a tank out of operation. In the event that the washer should require repairs, it is a simple matter for the maintenance man to leave a replacement with the dairy farmer while he repairs the washer at his leisure and in his shop, if desired, where more complete repairs may be accomplished.

It is an object of this invention to provide a portable washer for a bulk milk vacuum tank which effectively washes the inside of the tank and which, at the same time, can be conveniently removed for periodic inspection and cleaning. It is a further object to provide a portable washer for bulk milk vacuum tanks which both provides a cleaning means for the inside of the tank and agitation for the stored milk. It is a still further and more specific object of this invention to provide as a component in a milking system for milking farm animals, a cylindrical bulk milk tank having a lid which incorporates a washer which has the advantages set forth in the preceding text.

In the drawings:

FIGURE 1 is a perspective view of a bulk milk tank 10 illustrating the portable washer component of the invention in place on a bulk milk vacuum tank.

FIGURE 2 shows the portable washer component of the invention in elevation.

Referring now to the figures, there is a bulk milk tank 10 having an outer shell 11 and an inner shell 12. Between the shells 11 and 12 is insulation 9 and cooling coils (not shown). Leading from the inner shell 12 through the outer shell 11 is an outlet 14 which incorporates an outlet valve 15.

This particular tank 10 includes a conventional stirrer motor 16 with a stirring element 13 and two inspection openings 18 and 19 in the upper aspect of the tank 10. It will be understood that openings 18 and 19 extend both through the outer shell 11 and the inner shell 12. Opening 18 is covered by a conventional lid 20. However, opening 19 has a lid 21 which has mounted thereon a motor 22. Motor 22 is normally a high speed motor of approximately one-third horsepower which has suitable electrical connections not shown.

A handle 24 is disposed on top of the motor and it will be understood that by lifting handle 24, the entire installation including the lid 21 is lifted from the tank 10.

The lid 21 includes a centrally located flange 25. A horizontal transparent plate 26 composed of Plexiglas or other suitable material, such as stainless steel if transparency is not desired, is fixed to flange 25. The motor 22, Plexiglas plate 26, and flange 25 are all secured together by means of bolts 27 which depend from motor 22.

Extending through the center of the Plexiglas plate 26 is a shaft 28 which is keyed to the shaft 29 of the motor 22. As can be seen in FIGURE 2, shaft 28 is vertical and terminates near the bottom of the tank 10. To prevent any damage to the bottom of the tank 10, a rubber boot 30 is placed over the lower aspect of the shaft 28. However, it will be understood that, in practice, the bottom of the rubber boot 30 will be a fraction of an inch or so above the bottom of tank 10.

A propeller-type scoop 31 is attached to the lower end of the shaft 28 which turns from left to right as seen in the figures. Scoop 31 includes a lower broad portion 32 which initially scoops up the liquid placed in the tank and an upper slender portion 34 which aids in guiding a portion of the liquid in a more nearly vertical upward path. It will be noted that the upper and lower portions of the scoop 31 extend upwardly at a substantial angle to the bottom of the tank 10. It will also be noted that, in section, the lower scoop portion 32 is at substantially right angles to the upper portion 34. It has been found that, by so changing the pitch, the cleaning fluid in the bottom of the tank 10 is more uniformly dispersed and spattered over the sides of the inner shell 12.

Motor 22 may be either a multi-speed or single speed motor. If it is multi-speed, then the scoop 31 is adaptable both for cleaning and for agitating milk in the container. When used as an agitator, the portions 34 of the scoop 31 play an important part in extending the agitation to the entire volume of milk rather than limiting the agitating effect to the bottom portion of the tank.

In operation, several gallons of cleaning liquid or fluid will be introduced into the bottom portion of the tank 10. Valve 15 is then closed. If a conventional lid covers opening 19, this will be removed and replaced by the lid 21 together with the portable washer incorporated therein. When lid 21 is securely in place, the motor 22 is started at high speed. This causes the liquid in the bottom of the tank to be scooped up and dispersed or spattered against all sides of the tank with significant force, which is continued for, say, ten or fifteen minutes at which time the motor 22 is stopped and valve 15 opened in order that the liquid in the bottom of the tank 10 may be discharged through the outlet 14. After the liquid is discharged, clear water is poured into the bottom of the tank and motor 22 is again started. Valve 15 is, as before, closed.

The water in the tank is scooped up and again dispersed and spattered over the sides of the inner shell 12 for a complete rinsing job. The water is then dispelled through the valve 15 in outlet 14. This may be repeated once or several times to ensure complete rinsing. The tank 10 is now ready to be filled with milk.

If a multi-speed motor is used, the scoop 31 may be used in the milk in place of the motor 16 and stirring element 13 to agitate the milk gently while it is kept in the container. Lid 21 together with its attached apparatus is conveniently placed into or removed from tank 10 by means of the handle 24 on top of the motor 22. A bushing 36 for shaft 28 where it extends through lid 21 provides both a bearing for shaft 28 and acts as an effective sealing means between the interior and exterior of tank 10. Normally gaskets (not shown) will be placed about the periphery of openings 18 and 19 to engage the lids 20 and 21 for effective sealing purposes.

The above description and drawings disclose on embodiment of the invention and specific language has been employed in describing the several figures. It will, nevertheless, be understood that no limitation of the scope of the invention is thereby contemplated and the various alterations and modifications may be made such as would occur to one skilled in the art to which the invention pertains.

I claim:

1. A portable washer adapted to fit in the opening of a bulk milk tank, said washer comprising a lid for closing the opening, a motor mounted on said lid, a shaft depending from said motor, a plurality of scoops being comprised of an upper part and a lower part, said lower part being broader than said upper part and said parts being disposed at substantially right angles to one another.

2. A portable washer adapted to fit in the opening of a bulk milk tank, said washer comprising a lid for closing the opening, a motor mounted on said lid, a shaft depending from said motor, scoop means attached to the lower aspect of said shaft, said scoop means having an upper and lower part, said lower part having an enlarged portion, said parts extending upwardly at different pitches from each other.

3. The invention of claim 2 wherein the scoop means are comprised of a pair of scoops positioned on opposite sides of said shaft.

4. The invention of claim 2 wherein said upper and lower parts are disposed at substantially right angles to one another.

References Cited in the file of this patent

UNITED STATES PATENTS

| | | |
|---|---|---|
| 1,406,465 | Lynch | Feb. 14, 1922 |
| 1,982,059 | Lawler | Nov. 27, 1934 |
| 2,118,120 | Spang | May 24, 1938 |
| 2,144,715 | Dalzell | Jan. 24, 1939 |
| 2,203,672 | Chester | June 11, 1940 |
| 2,278,125 | Landgraf | Mar. 31, 1942 |
| 2,289,645 | Geistert | July 14, 1942 |
| 2,705,336 | Wilson | Apr. 5, 1955 |

FOREIGN PATENTS

| | | |
|---|---|---|
| 631,145 | Great Britain | Oct. 27, 1949 |